United States Patent [19]

Short

[11] 4,228,652

[45] Oct. 21, 1980

[54] EXHAUST NOZZLE FOR JET ENGINES

[76] Inventor: Allen E. Short, Frankton Rd., No. 1 R.D.,, Cromwell, New Zealand

[21] Appl. No.: 903,337

[22] Filed: May 5, 1978

[30] Foreign Application Priority Data

May 6, 1977 [NZ] New Zealand ............... 184028

[51] Int. Cl.³ ............................................. F02K 3/10
[52] U.S. Cl. ................................... 60/263; 60/271; 181/213; 239/265.19
[58] Field of Search ............... 60/263, 271; 181/213; 239/127.3, 265.19

[56] References Cited

U.S. PATENT DOCUMENTS

| | | | |
|---|---|---|---|
| 3,443,757 | 5/1969 | Townend | 239/265.19 |
| 3,578,106 | 5/1971 | Ellis | 239/127.3 |
| 3,579,993 | 5/1971 | Tanner | 239/127.3 |
| 3,613,826 | 10/1971 | Gabassut | 239/265.19 |
| 3,730,292 | 5/1973 | MacDonald | 181/213 |

*Primary Examiner*—Douglas Hart
*Attorney, Agent, or Firm*—Millen & White

[57] ABSTRACT

A nozzle for mounting to a jet engine at the exhaust end of the existing exhaust nozzle. The nozzle comprises a jet having an inlet for the exhaust gas jet which is exhausted from the exhaust exit of the engine. The jet inlet has means to divide the exhaust jet into two or more separate exhaust jet streams. The external surface of the body has means which create an airflow to combine with the separate jet streams which issue from the outlet end of the body.

9 Claims, 6 Drawing Figures

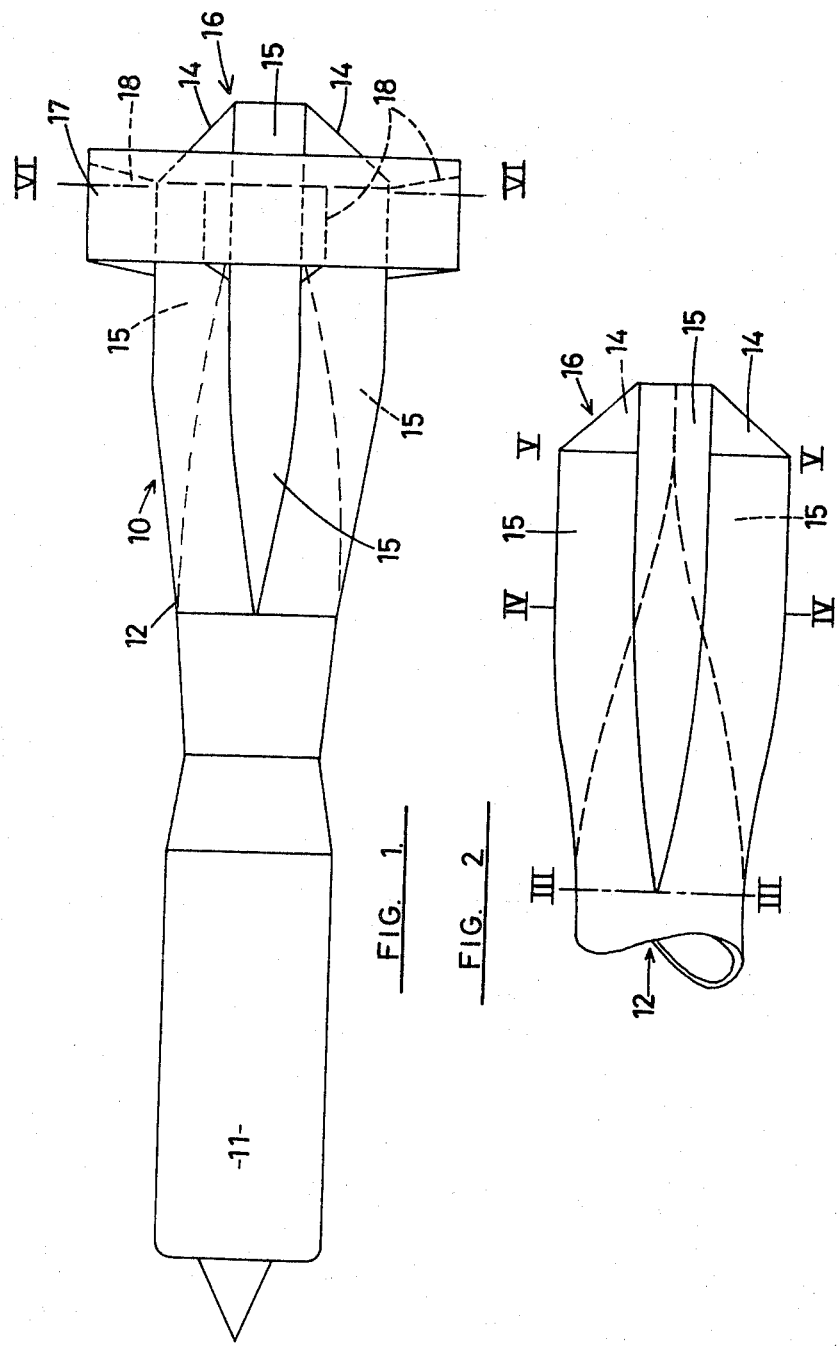

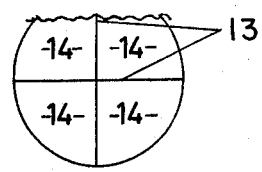
FIG. 3.
FIG. 4.
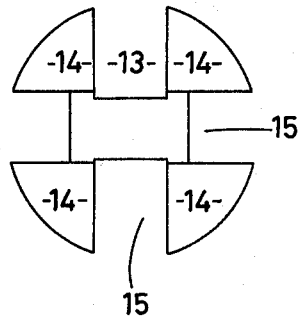
FIG. 5.
FIG. 6.
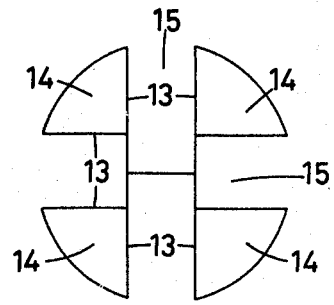

EXHAUST NOZZLE FOR JET ENGINES

This invention relates to a nozzle which is particularly designed for use with jet engines as found on aircraft.

The jet engine is now a widely used prime mover for aircraft and its well known advantages are many. However, with increasing fuel costs the efficiency of jet engines must be considered in an effort to reduce running costs. In addition, larger aircraft are being designed to move increased passenger and cargo payloads and this not only applied to long hauls but also, and possibly more especially, to short hauls. Associated with these increases in aircraft size runway lengths must be increased or alternatively the aircraft designed to take-off on shortened or existing runways. Finally, jet engines are noisy in operation and considerable pressure is being brought to bear on aircraft operators to reduce the noise especially when operating in or over highly populated areas.

The aim of the present invention is to provide a nozzle for use with jet engines which will assist in increasing the efficiency of such engines and go at least some way to overcoming the foregoing problems now associated with existing jet engines.

Broadly the invention in its broadest aspect can be said to consist of a nozzle for mounting to a jet engine at the exhaust end or the existing exhaust nozzle comprising a body having an inlet for the exhaust gas being exhausted from the exhaust exit of the engine said inlet having means to divide said exhaust jet into two or more separate exhaust jet streams and means formed with the external surface of said body to create an air flow which combines with the separate jet streams on issuing from the outlet end of said body.

In more fully describing the invention reference will be made to the accompanying drawings in which:

FIG. 1 is a side view of the nozzle according to the invention when mounted to the exhaust end of a conventional jet engine, FIG. 2 is a side view of the nozzle of FIG. 1 when rotated through 90° and without the throat ring or shroud, FIG. 3 is a schematic sectional view, showing the main constructional features, taken on line III—III of FIG. 2, FIGS. 4 and 5 are views similar to FIG. 2 but taken on lines IV—IV and V—V respectively of FIG. 2, and FIG. 6 is a sectional view taken on line VI—VI of FIG. 1 but with the throat ring removed.

In FIG. 1 the nozzle 10 is shown connected to the exhaust end of a conventional turbojet engine 11. Exhaust gas jet flow from the engine 11 enters the inlet end 12 of nozzle 10. Inlet end 12 has a pair of diametrically disposed dividing walls 13 which are at mutual right angles. The exhaust gas jet from engine 11 is thus split into four separate exhaust jet streams. These four distinct jet streams pass through the jet stream passages 14 shown in FIGS. 3 to 6 to exhaust at the outlet end 16 of the nozzle 10.

Channels 15 are formed in the external peripheral surface of the nozzle 10 and increase in depth toward the rear or outlet end 16 thereof. Channels 15 are clearly shown in the drawings it being noted that the depth of channel increases from nothing at section line III—III to full depth at section line V—V or VI—VI. Each channel 15 also increases in width from inlet end 12 to a point along the length of the nozzle body.

As will be appreciated from the drawings the jet stream passages 14 have an inclined outlet end whereas the outlet end of channels 15 adjacent the floor area thereof are planar and accordingly slightly rearward of the outlets of the jet stream passages.

In FIG. 1 a throat ring or shroud 17 is shown and is an annular body which is concentric with the central longitudinal axis of nozzle 10. The shroud 17 is maintained in this position by supports 18 which project radially outward from the sides of channels 15. This throat ring or shroud would preferably be incorporated on nozzles according to the invention which are designed for short haul/short runway operation but air resistance would mean that it is not particularly suitable for high speed aircraft on long hauls. The throat ring or shroud 17 can be longer than shown in the drawings to cover more of the exhaust jet streams and create a full vacuum, as will become apparent hereinafter, between the shroud and rounded portions of the exhaust jet streams.

In use the exhaust jet stream from engine 11 enters nozzle 10 and is immediately split to flow through jet passages 14. The passages 14 diverge away from one another due to the intervening channels 15. The sides of each channel 15 are parallel to each other especially near where each channel meets the exhaust jet discharge. This creates a vacuum between the exhaust jets which draw air into the channels from the front of the nozzle and into the exhaust jet streams. In addition, when the nozzle has a throat ring or shroud 17, the curved surfaces of the exhaust jet streams in conjunction with the shroud create an area of sub atmospheric pressure to draw air into the jet streams.

It is envisaged that at sea level the vacuum could be up to 14.7 lb per sq. inch with 10 lb per sq. inch as a working figure. This means that a nozzle according to this invention connected to a jet engine having an 18 inch diameter nozzle will create approximately 4780 lb suction on the air from the front with the throatpiece in place and approximately 2300 lbs without the throatpiece. Added to these figures will be the pressures of the exhaust jet streams on the air to the rear, reduced in pressure by pressing on over 2½ times the original area of the exhaust nozzle of the jet engine by itself.

This nozzle design enables a jet engine to create vacuum, drawing outer or secondary air into the exhaust jet streams so providing a much larger area of discharge to create a larger area of push. This will bring the mushroom effect set up by the exhaust jet streams much closer to the aircraft thus reducing noise, increasing efficiency and decreasing the amount of polution in the air. Using the throat-piece or shroud the nozzle will create a draw of at least 10 lb per sq. inch on the air in front of the engine and will also create thrust on the air to the rear. If the throttle is opened up quickly with this layout the engine will not bolt as solid jets do thus allowing for a much quicker take off from runways.

What is claimed is:

1. An exhaust nozzle for a jet engine having an exposed external peripheral surface and comprising an outlet section to discharge exhaust gas to the atmosphere; an inlet section of substantially circular cross section to receive the exhaust gas from the jet engine; partitioning in the nozzle which divides the inlet section into a plurality of sectors and forms a plurality of exhaust ducts having a sectorial cross section and flat inwardly projecting side walls, which ducts extend rearwardly from a contiguous position proximate the inlet section such that adjacent ducts have a contiguous common radial wall, to a position at the outlet section such that the ducts diverge outwardly with respect to one another and to the central longitudinal axis of the nozzle; a free air channel formed in the outer surface of the nozzle between each adjacent pair of exhaust ducts, each channel having inwardly projecting side walls formed in part by the opposing flat side walls of an adjacent pair of exhaust ducts, each channel extending to the nozzle outlet and being open ended thereat, and each channel beginning as a shallow groove at a point proximate the inlet section and gradually increasing in width and depth in the direction of the outlet section so as to form a plurality of paths of air flowing over the outer surface of the nozzle.

2. The exhaust nozzle according to claim 1 wherein at least a portion of the discharge end of each channel at the outlet section extends beyond the discharge end of each of the exhaust ducts.

3. The exhaust nozzle according to claim 2 wherein the ends of the ducts at the outlet section are inclined and the ends of the channels thereat are planar.

4. The exhaust nozzle according to claim 1, wherein the internal partitioning at the inlet section are walls diametrically disposed at mutual right angles and which form four exhaust ducts.

5. The exhaust nozzle according to claim 1 wherein a shroud in the form of an annular body of larger internal diameter than the external diameter of the nozzle at the outlet section is positioned coaxially around the outlet section so as to form a vacuum by the air flowing therebetween.

6. The exhaust nozzle according to claim 4 wherein the annular body is connected to the ducts by supports which extend radially outward from the or adjacent the flat sides of the channels.

7. The exhaust nozzle according to claim 4 wherein at least a portion of the discharge end of each channel at the outlet section extends beyond the discharge end of each of the exhaust ducts and wherein a shroud in the form of an annular body of larger internal diameter than the external diameter of the nozzle at the outlet section is positioned coaxially around the outlet section so as to form a vacuum by the air flowing therebetween.

8. In a jet engine having an exhaust nozzle for discharging exhaust gas from the jet engine to the atmosphere, the improvement wherein the exhaust nozzle has an exposed external peripheral surface and comprises an outlet section to discharge exhaust gas to the atmosphere; an inlet section of substantially circular cross section to receive the exhaust gas from the jet engine; partitioning in the nozzle which divides the inlet section into a plurality of sectors and form a plurality of exhaust ducts having a sectorial cross section and flat inwardly projecting side walls, which ducts extend rearwardly from a contiguous position proximate the inlet section such that adjacent ducts have a contiguous common radial wall, to a position at the outlet section such that the ducts diverge outwardly with respect to one another and to the central longitudinal axis of the nozzle; a free air channel formed in the outer surface of the nozzle between each adjacent pair of exhaust ducts, each channel having inwardly projecting side walls formed in part by the opposing flat side walls of an adjacent pair of exhaust ducts, each channel extending to the nozzle outlet and being open ended thereat, and each channel beginning as a shallow groove at a point proximate the inlet section and gradually increasing in width and depth in the direction of the outlet section so as to form a plurality of paths of air flowing over the outer surface of the nozzle.

9. The jet engine according to claim 8 wherein the internal partitioning at the inlet section of the exhaust nozzle thereof are walls diametrically disposed at mutual right angles and which form four exhaust ducts; wherein at least a portion of the discharge end of each channel at the outlet section extends beyond the discharge end of each of the exhaust ducts; and wherein a shroud in the form of an annular body of larger internal diameter than the external diameter of the nozzle at the outlet section is positioned coaxially around the outlet section so as to form a vacuum by the air flowing therebetween.

* * * * *